United States Patent Office 2,951,309
Patented Sept. 6, 1960

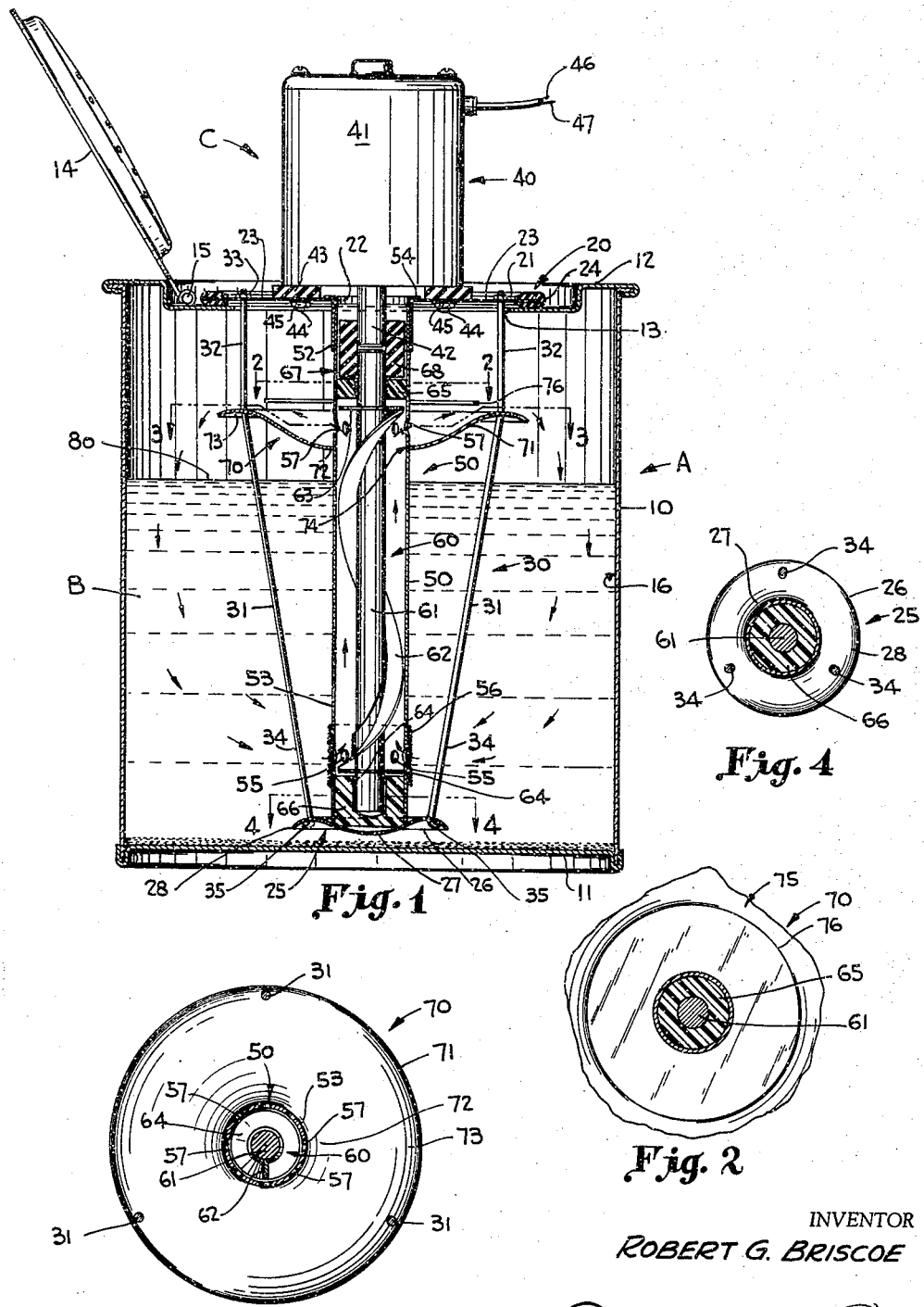

2,951,309

AERATING AND COOLING APPARATUS FOR LIQUID CONTAINING RECEPTACLES

Robert G. Briscoe, W. 18th and Wynnewood, Sulphur, Okla.

Filed Apr. 6, 1959, Ser. No. 804,487

9 Claims. (Cl. 43—57)

This invention relates to aerating pump minnow buckets and more specifically to the pump and pumped liquid distribution apparatus thereof.

An important object of the invention is to provide a portable apparatus for insertion into a conventional receptacle, as a minnow bucket, for not only aerating the water therein but also cooling the water, somewhat in the same manner as a waterfall aerates and cools the water into which it falls.

Another important object is to provide such apparatus which, while it contains movable parts, is so constructed that the live bait, as minnows, is protected from all of the moving parts so the bait will not become injured thereby.

Still another important object is to provide aerating and cooling apparatus as described which depends upon an upward flow of water through a pump housing and the discharge of the pumped water, as a thin sheet of droplets of falling water, well above the level of the water in the receptacle, so that the water will be cooled and well aerated, since provision is made for the access of outside air into the receptacle for contact with the falling water.

A further important object is to provide an apparatus which is exceptionally small in bulk so that a large part of a conventional minnow bucket chamber is left free for the water and live bait.

In addition, an important object is to provide an apparatus as described which is light in weight but does not require means, as clamps, latches, bolt and nut assemblies or the like, to mount it upon a conventional minnow bucket, but may be disposed upon the rim portion of the top wall thereof, free to be simply lifted off when it is desired to remove the same.

Other objects and advantages of the invention will be apparent during the course of the following detailed description of the invention, taken in connection with the accompanying drawing, forming a portion of this disclosure, and in which drawing:

Fig. 1 is a vertical sectional view of the apparatus of this invention, mounted upon and projecting into a receptacle containing a liquid.

Figs. 2, 3 and 4 are horizontal sectional views of the apparatus taken on their respective lines of Fig. 1, but of the apparatus removed from the receptacle and water of Fig. 1.

In the drawing, wherein for the purpose of illustration is shown a preferred embodiment of the invention and wherein similar reference characters designate corresponding parts throughout the several views, the letter A designates a receptacle; B, liquid within the receptacle; and C, the apparatus of the invention.

The receptacle A may be of any approved kind, such as a conventional minnow bucket, with side wall 10, bottom wall 11, top wall 12, provided with a central opening 13, and closure 14, which may be hinged, as at 15, to the top wall. In such buckets, the central opening is generally large, and the chamber 16, within the receptacle, is roomy and is adapted to contatin a liquid B, preferably fresh water, and live fish (not shown), as minnows, for example.

Included in the apparatus C are major or upper support means 20, minor or lower support means 25, and connecting means 30 between the means 20 and 25.

The major or upper support means 20 preferably compreses a substantially flat substantially circular disc body 21, providing a closure or cover, having a central opening 22, a plurality of spaced-apart air passageways or openings 23 spaced concentrically about the opening 22, and a resilient rim portion 24, as of rubber, about the outer periphery of the disc body 21, which rim portion 24 is adapted to removably rest upon the upper face of the top wall 12, with the passageways 23 in communication with the chamber. The central opening accommodates a portion of a shaft 42, and a portion of a pump housing 51, both to be referred to subsequently. The resilient material of the rim portion 24 tends to frictionally grip the top wall 12, when weight is applied to the disc body 21 and prevents shifting of the latter, as well as provides a cushion and prevents marring of the wall 12. The disc body may be of steel or aluminum for example.

As part of the means 40 I may provide any suitable source of power. For example, by way of electric leads 46 and 47 and conventional electric connectors secured thereto, I may tap electric current from the electrical system of a motor vehicle (not shown) or from a storage battery or storage batteries (also not shown).

Spaced below the major support means 20 is the minor or lower support means 25 which is preferably a substantially circular disc body 26 preferably having a central concavity 27 but with a convex downturned rim portion 28 with a preferably rounded edge. The disc body 26 is disposed adjacent the bottom wall 11. The disc body 26 may be of metal, such as aluminum or stainless steel, for example, with some resiliency.

Connecting means 30 connect the disc bodies 21 and 26 in spaced-apart relationship, and preferably comprises a plurality (as three) of substantially equally spaced-apart elongated members 31, such as rigid rods or stout wires of aluminum or stainless steel. Their preferably vertically extending upper end portion 32 may be provided with screw threads to receive conventional nuts 33 and these upper end portions extend upwardly through suitable openings just large enough in diameter to snugly receive them, in the disc body 21 preferably spaced outwardly of the passageways 23. Each of the upper end portions 32 extends downwardly for a portion of its length, and the member 31 then forms a lower end portion 34 which preferably extends gradually toward the longitudinal axis of the apparatus C and their terminal portions 35 are secured to the disc body 21 at the rim portion 27. This may be effected by providing suitable spaced apart openings through the rim portion to snugly receive the terminal portions 35 and the terminal portions then upset, as is apparent in Fig. 1, where it can be readily appreciated that the rim portion 27 tends to resiliently hold the upset portions securely. The portions 32 and 34, at their juncture, form a shoulder or angle and, at the apex thereof, the receptacle 71 (to be subsequently described) is supported by the connecting means 30, so that the receptacle will not move downwardly.

Mounted upon the disc body 21 of the support means 20 may be any suitable impeller-rotating means 40. In the example shown, this means may comprise an electric motor with the housing 41 thereof bolted to the disc body 21 to extend upwardly therefrom and with the shaft 42 extending through the opening 22 and downwardly thereof. I prefer to provide a suitable resilient means 43, as a sheet or block of rubber or the like, interposed between the housing 41 and disc body 21 which may be provided with a central opening to accommodate the shaft 42 and suitable spaced-apart openings to accommodate conventional screw threaded bolt shanks 44 extending from the housing 41, then through the spaced-apart openings in the sheet or block of the means 43, and through axially-aligned openings in the disc body 21, with their projecting ends receiving suitable nuts 45. Such mountings are conventional for supporting electric motors and the like.

Referring next to the pump means 50, the same includes an elongated tubular housing 51 comprising an upper portion 52 and a lower portion 53, with the former provided with an outwardly-extending flange 54 disposed upon the upper face of the disc body 21 at the opening 22. The lower portion 53 may be telescoped with the upper portion 52, to provide a slip joint in order to allow for slight movements due to vibrations and the like. Preferably adjacent the lower part of the lower portion 53 is a plurality of liquid intake passageways or ports 55, which may be screened, as with a sleeve 56 of suitable mesh (such as of suitable hardened interconnected plastic strands or of interconnected aluminum strands) and at the upper part of the lower portion 53, below the telescoping portions, there is provided a plurality of liquid exit passageways or ports 57 preferably of the same number and size as the ports 55, and spaced a substantially equal distance apart, this being a factor for the efficient operation of the apparatus. The sleeve 56 is adapted to prevent minnows or foreign solids from entering the ports 55. The housing portions 52 and 53 may be, for example, of aluminum or stainless steel tubing or the like.

Disposed within the housing 51 is impeller means 60 which includes an elongated shaft 61 secured to which is a helical fin structure 62 which extends along the intermediate portion of the shaft 61 with its outer edge closely adjacent the inner face of the housing portion 53. At both ends of the structure 62 are discs 63 and 64 respectively, secured to the shaft 61, the peripheries of which discs are preferably closely adjacent the inner face of the housing portion 53. These discs may be of nylon. It will be noted that the structure 62 embodies a very gradual curve about the shaft 61. This is important, as I prefer to eliminate any speed reduction mechanism and the gradual curve provides enough lift so that there will be no violent spurt of liquid from the upper ports 57, which are adjacent the upper end of the structure 62. The lower ports 55 are equally adjacent the lower end of the same structure. Any suitable material may constitute the shaft 61 and structure 62, such as cast aluminum or stainless steel and the like.

Also forming a part of the pump means 50 are the bearings 65 and 66 with the former within the upper part of housing portion 52 above the ports 57 and the latter within the lower part of this portion 52 below the ports 55. The shaft 61 extends through and upwardly of the bearing 65 while the lower end portion of the shaft is seated in a socket in the bearing 66. Both bearings are preferably of nylon, which requires no lubricant. Practically all lubricants would be detrimental to piscatorial life if the lubricants got into the liquid stream or liquid B.

Still a part of the pump means 50 is coupling means 67 between the outer end portion of the shaft 42 and upper end portion of the shaft 61. I prefer to provide a flexible coupling 68 which may be of rubber or the like, having a central bore to receive these end portions of the shafts in a good frictional gripping relationship and is spaced from the housing wall, but not enough to permit water to get to the motor housing.

Now, with reference to liquid discharge receiving and guiding means 70 for the liquid ejected from the ports 57, I provide a basinlike receptacle 71 with a central convex body portion 72 and a convex rim portion 73. This receptacle is of greater diameter and considerably deeper than the disc body 26, and has a central opening 74 to receive a part of the housing portion 52 to which it is fixedly secured in any approved way. At the rim portion 73 there are provided a plurality of openings to receive portions of the elongated members 31. These portions extend through the openings at the juncture of the converging and vertical portions 34 and 32 of the members 31 and, as may be appreciated from Fig. 1, the converging portions 34 prevent any movement of the receptacle 71 downwardly. Conversely, the receptacle 71 provides braces for the members 31. It will be noted that the receptacle 71 joins the housing 51 somewhat below the plane of the ports 57 and that the convex rim portion 73 is above this plane and, when the apparatus is in use, the horizontal planes of the receptacle 71 should be as truly horizontal as possible so that the pumped liquid will fall as a thin sheet over the rim portion 73.

As a part of the means 70, I prefer to provide an anti-splash device or baffle which may comprise a flat plate or disc 75 secured to the housing 51, above the horizontal plane of the receptacle 71 and with its outer periphery adjacent the rim portion 73, substantially as shown in Fig. 1.

I have discovered that the shape of the receptacle 71 and its position with relationship to the ports 57 prevents a violent discharge of liquid, as water, from the rim portion 73 against the wall 10 of the receptacle A. This would be detrimental for what I desire is aeration and cooling of the liquid and not mere agitation thereof. Splashing of the liquid against the wall 10 would tend to cool that wall, but the liquid would then lack the temperature to cool the body of liquid. The overflow of the liquid over the rim portion 73 is shown by the arrows in Fig. 1 where it reaches the liquid level 80. The receptacle 71 is preferably of a substantially rust proof material such as aluminum, or stainless steel.

In the use of my apparatus C, after a suitable level of liquid B is provided in the receptacle A and the live bait, as minnows, introduced to the liquid B, the apparatus C is inserted, lower end first, until the upper support means 20 rests upon the top wall 12, whereupon the impeller-rotating means 40 can be set into operation. Because of the relatively very slim form of the liquid-inserted portion of the apparatus, insertion is made easy, even without light and there is ample space for the minnows, or like fish, to swim about. There are no moving parts of the apparatus to come into contact with the fish.

It was discovered that operation of the apparatus need be carried on for only a few minutes at a time. A conventional electric motor rotates its shaft about 3500 r.p.m., and this, since no reduction gearing is necessary, entails operation of 3 to 4 minutes every 30 minutes or so, employing a minnow bucket of ordinary size. In even hot weather, this 3 to 4 minute operation will lower the temperature of the water within a bucket by about 5° F.

Various changes may be made to the forms of the invention herein shown and described, without departing from the spirit of the invention or scope of the following claims.

What is claimed is:

1. Apparatus for aerating and cooling a body of liquid within a container having an upwardly-opening mouth and a wall extending about said mouth; said apparatus including support means for positioning above said mouth; liquid pumping means carried by said support means for disposal in said body of liquid and spaced from said wall, said liquid pumping means including an upwardly-extending housing provided, adjacent its upper end portion, with a plurality of pumped liquid exit ports; imperforate pumped liquid discharge-receiving and guiding means, including a horizontally-disposed receptacle carried by said housing for positioning above the level of said body of liquid, said receptacle having a concave central portion adjoining said housing below the horizontal planes of said ports and surrounding a portion of said housing, and a convex outermost peripheral portion disposed above said planes, said concave central portion and said convex outermost peripheral portion forming a receptacle of sufficient depth for an accumulation of liquid therein to substantially cover said ports; and means operatively connected with said pump to operate said pump means for pumping said liquid upwardly through said housing and out of said exit ports.

2. Apparatus according to claim 1 characterized in that said support means includes a cover for said receptacle, provided with a plurality of air passageways opening to the interior of said container, a lower horizontally-disposed support spaced below said cover and spaced from said container, and an elongated member connecting said cover and lower support, the lower end of said pump housing resting upon said lower support in juxtaposed spaced position within said container.

3. Apparatus according to claim 2 characterized in that said horizontally-disposed receptacle is provided with an opening and said elongated member extends through said opening in snug fit therein, whereby said receptacle and elongated member tend to brace one another.

4. Apparatus according to claim 2 characterized in that said horizontally-disposed receptacle is provided with an opening, and said elongated member extends substantially vertically through said opening, in a snug fit, and extends, from the lower mouth of said opening, toward the axial center of said lower support, whereby said elongated member provides a shoulder upon which said receptacle rests, whereby said receptacle and elongated member tend to brace one another.

5. Apparatus for aerating and cooling a body of liquid within a container having an upwardly-opening mouth and a wall extending about said mouth; said apparatus including support means for positioning above said mouth; liquid pumping means carried by said support means for disposal in said body of liquid and spaced from said wall, said liquid pumping means including an upwardly-extending housing provided, adjacent its upper end portion, with a plurality of pumped liquid exit ports; imperforate pumped liquid discharge-receiving and guiding means, including a horizontally-disposed receptacle carried by said housing for positioning above the level of said body of liquid, said receptacle having a concave central portion adjoining said housing below the horizontal planes of said ports and surrounding a portion of said housing, and a convex outermost peripheral portion disposed above said planes, said concave central portion and said convex outermost peripheral portion forming a receptacle of sufficient depth for an accumulation of liquid therein to substantially cover said ports; said pumped liquid discharge-receiving and guiding means also including a circular plate carried by said housing, facing and spaced from said receptacle and extending with its periphery adjacent said convex outer peripheral portion of said receptacle; and means operatively connected with said pump to operate said pump means for pumping said liquid upwardly through said housing and out of said exit ports.

6. Apparatus for aerating and cooling a body of liquid within a minnow bucket having a top wall and an upwardly-opening mouth therein, said apparatus including support means having a support disc for disposal over said mouth and for being carried by said wall, said disc being provided with a plurality of air intake passageways for opening to the interior of said bucket, a concave disc spaced below and facing said support disc and of less diameter than the diameter of said support disc, and a plurality of spaced-apart elongated rigid members connected between said discs, each member having an upper substantially vertical portion and a lower portion extending toward the vertical axis of said concave disc, whereby, at the juncture of said two portions, a shoulder is provided; liquid pump means including a vertically-disposed telescopic tubular pump housing having a plurality of liquid intake ports adjacent its lower end and a plurality of liquid outlet ports spaced above said intake ports and below said support disc, with the lower end portion of said housing seated upon said concave disc and said upper end portion connected to said support disc; imperforate pumped liquid discharge-receiving and guiding means, including a horizontally-disposed receptacle, encircling a portion of said pump housing at a location below the horizontal planes of said exit ports and for positioning above the level of said body of liquid, said receptacle having a concave central portion surrounding a portion of said pump housing and a convex outermost peripheral portion disposed above said planes and being supported upon the shoulders of said elongated rigid members, said concave central portion and said convex outermost peripheral portion forming a basin for an accumulation of liquid therein to substantially cover said ports; and means operatively connected to said pump means to operate said pump means for pumping said liquid from said intake ports, upwardly through said pump housing and out of said exit ports.

7. Apparatus according to claim 6 characterized in that said pumped liquid discharge-receiving and guiding means also includes a baffle plate carried by said housing, facing and spaced slightly above said receptacle and extending with the periphery of said baffle plate adjacent said convex outer peripheral portion of said receptacle.

8. Apparatus for aerating and cooling a body of liquid within a container including liquid pumping means; support means for maintaining said liquid pumping means in juxtaposed relationship within said container and disposed in said body of liquid; said liquid pumping means including an upwardly extending housing having inlet and outlet ports adjacent the lowermost and uppermost ends respectively, and liquid impeller means mounted within said housing for raising the liquid within said housing from said inlet ports to discharge from said outlet ports with a minimum of turbulence; and an imperforate plate mounted on said housing and disposed for positioning above the body of liquid in said container, said imperforate plate having a concave central portion disposed below said outlet ports for receiving liquid therefrom, and a peripheral portion disposed above the horizontal plane of said outlet ports, so that liquid discharged from said outlet ports is emitted into a body of liquid contained within said concave portion of said imperforate plate, minimizing any turbulence created by said impeller means, and the liquid is discharged from said imperforate plate over the peripheral portion thereof in a free-fall through air to said body of liquid, thus providing for natural cooling and aeration of said body of liquid with minimum unnatural turbulence.

9. Apparatus as specified in claim 8 wherein said liquid impeller means includes a shaft extending from adjacent said inlet ports to adjacent said outlet ports, and a helical blade mounted upon said shaft, said helical blade extending from adjacent said inlet ports to adjacent said outlet ports.

References Cited in the file of this patent
UNITED STATES PATENTS

| | | |
|---|---|---|
| 2,137,397 | Haldeman | Nov. 22, 1938 |
| 2,865,618 | Abell | Dec. 23, 1958 |